(12) United States Patent
Tham et al.

(10) Patent No.: US 11,968,460 B2
(45) Date of Patent: *Apr. 23, 2024

(54) IMAGE CAPTURE EYEWEAR WITH AUTO-SEND

(71) Applicant: Snap Inc., Santa Monica, CA (US)

(72) Inventors: Yu Jiang Tham, Seattle, WA (US); Mitchell Bechtold, Los Angeles, CA (US); Antoine Ménard, Palm Springs, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/875,127

(22) Filed: Jul. 27, 2022

(65) Prior Publication Data

US 2022/0368828 A1 Nov. 17, 2022

Related U.S. Application Data

(63) Continuation of application No. 17/218,824, filed on Mar. 31, 2021, now Pat. No. 11,451,707, which is a
(Continued)

(51) Int. Cl.
*H04N 23/80* (2023.01)
*G06F 3/0482* (2013.01)
(Continued)

(52) U.S. Cl.
CPC ........... *H04N 23/80* (2023.01); *G06F 3/0482* (2013.01); *G09G 3/32* (2013.01); *H04B 1/385* (2013.01);
(Continued)

(58) Field of Classification Search
CPC .......... G02B 27/017; G02B 2027/0141; G02B 2027/0178; G02B 2027/0138;
(Continued)

(56) References Cited

U.S. PATENT DOCUMENTS 10,021,474 B2  7/2018  Abreu
10,972,658 B2  4/2021  Tham et al.
(Continued)

FOREIGN PATENT DOCUMENTS

CN  107250882 A  10/2017
JP  6046005 B2  12/2016
(Continued)

OTHER PUBLICATIONS

1st Chinese Office Action for Chinese Application No. 201980029168.6 dated May 7, 2022 (5 pages).
(Continued)

*Primary Examiner* — David Tung
(74) *Attorney, Agent, or Firm* — Culhane Meadows PLLC; Stephen J. Weed (57) ABSTRACT

A system including image capture eyewear, a processor, and a memory. The image capture eyewear includes a support structure, a selector connected to the support structure, a display system (e.g., LEDs or a display) connected to the support structure to distinctly display assignable recipient markers, and a camera connected to the support structure to capture an image of a scene. The processor executes programming in the memory to assign recipients to the assignable recipient markers, receive a captured image of the scene, receive an indicator associated with the assignable recipient markers distinctly displayed at the time the image of the scene was captured, and transmit the captured image to the recipient assigned to the distinctly displayed assignable recipient markers.

20 Claims, 9 Drawing Sheets

Related U.S. Application Data continuation of application No. 16/391,601, filed on Apr. 23, 2019, now Pat. No. 10,972,658.

(60) Provisional application No. 62/665,018, filed on May 1, 2018.

(51) Int. Cl.
  *G09G 3/32* (2016.01)
  *H04B 1/3827* (2015.01)
  *H04N 23/51* (2023.01)

(52) U.S. Cl.
  CPC ..... *H04N 23/51* (2023.01); *H04B 2001/3866* (2013.01)

(58) Field of Classification Search
  CPC . G02B 2027/014; G06F 1/163; G06F 1/1686; G06F 3/0482; G06F 3/011; G06F 3/0304; G09G 3/32; H04N 23/80; H04N 23/51; H04N 23/57; H04N 23/617; H04N 23/62; H04B 1/385; H04B 2001/3866
  See application file for complete search history.

(56) References Cited

U.S. PATENT DOCUMENTS

| | | | |
|---|---|---|---|
| 11,451,707 B2 | 9/2022 | Tham et al. | |
| 2008/0192114 A1* | 8/2008 | Pearson | G03B 17/08 396/25 |
| 2012/0019645 A1 | 1/2012 | Maltz | |
| 2012/0281961 A1 | 11/2012 | Forbes | |
| 2013/0085345 A1 | 4/2013 | Geisner et al. | |
| 2015/0009309 A1* | 1/2015 | Heinrich | G02B 27/017 348/61 |
| 2015/0381885 A1* | 12/2015 | Kim | G06F 3/017 348/207.1 |
| 2016/0171780 A1 | 6/2016 | Vardi | |
| 2016/0246367 A1 | 8/2016 | Tungare et al. | |
| 2016/0350595 A1 | 12/2016 | Solomin et al. | |
| 2017/0323584 A1 | 11/2017 | Daniel et al. | |
| 2017/0329398 A1 | 11/2017 | Raffle et al. | |
| 2018/0150133 A1 | 5/2018 | Cho et al. | |
| 2019/0331914 A1* | 10/2019 | Lee | G06F 3/013 |
| 2019/0342493 A1 | 11/2019 | Tham et al. | |

FOREIGN PATENT DOCUMENTS

| | | |
|---|---|---|
| KR | 1020130051622 A | 5/2013 |
| KR | 1020140128489 A | 11/2014 |
| KR | 1020180004112 A | 1/2018 |
| WO | 2013070019 A1 | 5/2013 |
| WO | 2014172777 A1 | 10/2014 |

OTHER PUBLICATIONS

Extended European Search Report for European Application No. 19796198.0, dated Mar. 28, 2022 (dated Mar. 28, 2022)—9 pages.
International Search Report and Written Opinion for International Application No. PCT/US2019/028664, dated Sep. 11, 2019 (dated Sep. 11, 2019)—10 pages.
Notice of Allowance for Chinese Application No. 201980029168.6 dated Oct. 9, 2022 (6 pages).

* cited by examiner

IMAGE CAPTURE EYEWEAR WITH AUTO-SEND

CROSS-REFERENCE TO RELATED APPLICATIONS

This application is a Continuation of U.S. application Ser. No. 17/218,824 filed on Mar. 31, 2021, which is a Continuation of U.S. application Ser. No. 16/391,601 filed on Apr. 23, 2019, now U.S. Pat. No. 10,972,658, which claims priority under 35 U.S.C. § 119(e) to U.S. Provisional Patent Application No. 62/665,018, filed on May 1, 2018, which applications are hereby incorporated herein by reference in their entireties.

TECHNICAL FIELD

The present subject matter relates to image capture eyewear, e.g., smart glasses, and, more particularly, to image capture eyewear with indicators for indicating an intended recipient for captured images and automatically sending the captured images to the recipient.

BACKGROUND

Image capture eyewear, such as smart glasses, headwear, and headgear available today integrate lenses, cameras, and wireless network transceiver devices. Users of such eyewear desire added functionality to improve convenience and efficiency.

BRIEF DESCRIPTION OF THE DRAWINGS

The drawing depict implementations, by way of example only, not by way of limitations. In the figures, like reference numerals refer to the same or similar elements. When a plurality of similar elements are present, a single reference numeral may be assigned to the plurality of similar elements with a small letter designation referring to specific elements. When referring to the elements collectively or to a non-specific one or more of the elements, the small letter designation may be dropped.

DETAILED DESCRIPTION

In the following detailed description, numerous specific details are set forth by way of examples in order to provide a thorough understanding of the relevant teachings. However, it should be apparent to those skilled in the art that such details are not necessary to practice the present teachings. In other instances, a relatively high-level description, without detail, of well-known methods, procedures, components, and circuitry avoids unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices may not physically connect with one another and may be separated by airspace, intermediate components, elements or communication media that may modify, manipulate or carry the light or signals.

The orientations of the image capture eyewear, associated components, and any devices incorporating an LED such as shown in any of the drawings, are by way of example only, for illustration and discussion purposes. In operation, orientation of the image capture eyewear may be in other directions suitable to the particular application of the image capture eyewear, for example up, down, sideways, or any other orientation. Also, any directional term, such as front, rear, inwards, outwards, towards, left, right, lateral, longitudinal, up, down, upper, lower, top, bottom and side, is exemplary, and not limiting, as to direction or orientation.

Example image capture eyewear has an optical element, electronic components, a support structure configured to support the optical element and the electronic components, and a display system coupled to the electronic components and supported by the support structure. The display structure distinctly presents assignable recipient markers associated with intended recipients (e.g., by the image capture eyewear or a remote personal computing device coupled to the image capture eyewear) for images captured by the image capture eyewear. The wearer of the image capture eyewear may select which assignable recipient markers are distinctly presented (e.g., by pressing a button on the image capture eyewear) and, when an image is captured, that image is automatically sent to the recipient(s) associated with the distinctly presented assignable recipient marker. Thus, the wearer can send a photo conveniently and efficiently to one or more friends and/or family.

Figure 1A:
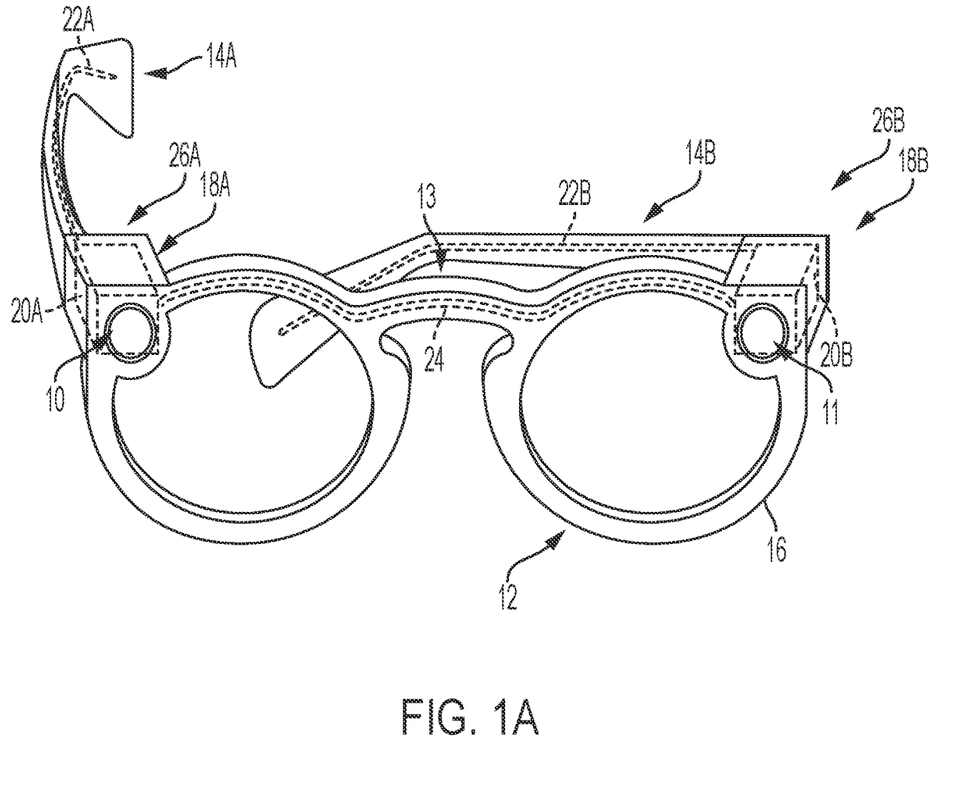
FIG. 1A is a perspective view of an image capture eyewear example including electronic components and a support structure supporting the electronic components.

FIG. 1A depicts a front perspective view of an example image capture eyewear 12 for capturing images and identifying where those images are automatically sent. The illustrated image capture eyewear 12 includes a support structure 13 that has temples 14A and 14B extending from a central frame portion 16. Image capture eyewear 12 additionally includes articulated joints 18A and 18B, electronic components 20A and 20B, and core wires 22A, 22B and 24. Although the illustrated image capture eyewear are glasses, the image capture eyewear may take other forms such as a headset, head gear, helmet, or other device that may be worn by the user.

Support structure 13 supports one or more optical elements within a field of view of a user when worn by the user. For example, central frame portion 16 supports the one or more optical elements. As used herein, the term "optical elements" refers to lenses, transparent pieces of glass or plastic, projectors, screens, displays and other devices for presenting visual images or through which a user perceives visual images. In an embodiment, respective temples 14A and 14B connect to central frame portion 16 at respective articulated joints 18A and 18B. The illustrated temples 14A and 14B are elongate members having core wires 22A and 22B extending longitudinally therein.

Temple 14A is illustrated in a wearable condition and temple 14B is illustrated in a collapsed condition in FIG. 1A. As shown in FIG. 1A, articulated joint 18A connects temple 14A to a right end portion 26A of central frame portion 16. Similarly, articulated joint 18B connects temple 14B to a left end portion 26B of central frame portion 16. The right end portion 26A of central frame portion 16 includes a housing that carries electronic components 20A therein, and left end portion 26B includes a housing that carries electronic components 20B therein.

A plastics material or other material embeds core wire 22A, which extends longitudinally from adjacent articulated joint 18A toward a second longitudinal end of temple 14A. Similarly, the plastics material or other material also embeds core wire 22B, which extends longitudinally from adjacent articulated joint 18B toward a second longitudinal end of temple 14B. The plastics material or other material additionally embeds core wire 24, which extends from the right end portion 26A (terminating adjacent electronic components 20A) to left end portion 26B (terminating adjacent electronic components 20B).

Electronic components 20A and 20B are carried by support structure 13 (e.g., by either or both of temple(s) 14A, 14B and/or central frame portion 16). Electronic components 20A and 20B include a power source, power and communication related circuitry, communication devices, display devices, a computer, a memory, modules, and/or the like (not shown). Electronic components 20A and 20B may also include a camera/microphone 10 for capturing images and/or videos, and indicator LEDs 11 indicating the operational state of image capture eyewear 12.

In one example, temples 14A and 14B and central frame portion 16 are constructed of a plastics material, cellulosic plastic (e.g., cellulosic acetate), an eco-plastic material, a thermoplastic material, or the like, with core wires 22A, 22B and 24 embedded therein. Core wires 22A, 22B and 24 provide structural integrity to support structure 13 (i.e., temple(s) 14A, 14B and/or central frame portion 16). Additionally, core wires 22A, 22B and/or 24 act as a heat sink to transfer heat generated by electronic components 20A and 20B away therefrom so as to reduce the likelihood of localized heating adjacent electronic components 20A and 20B. As such, core wires 22A, 22B and/or 24 thermally couple to the heat source to provide a heat sink for the heat source. Core wires 22A and 22B and/or 24 include relatively flexible conductive metal or metal alloy material such as one or more of an aluminum, an alloy of aluminum, alloys of nickel-silver, and a stainless steel, for example.

Figure 1B:
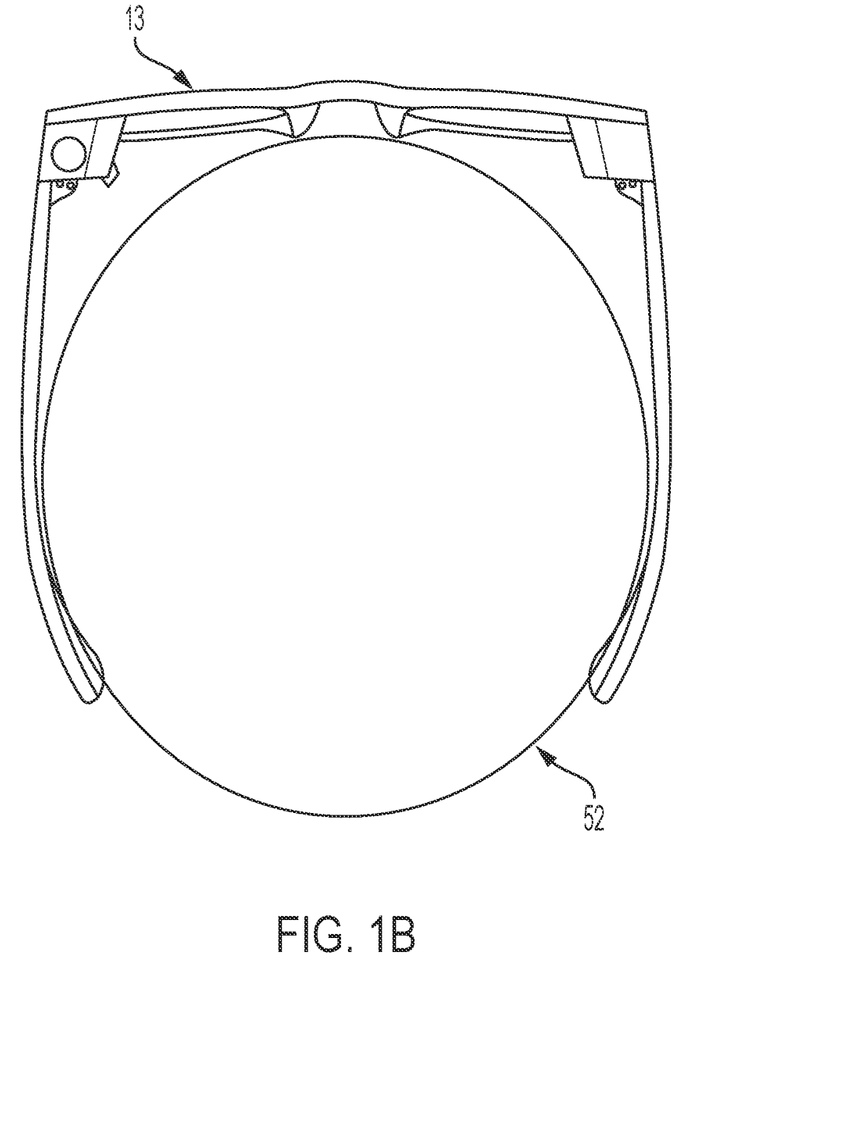
FIG. 1B is a top view of the image capture eyewear example of FIG. 1A illustrating a region defined by the image capture eyewear for receiving a head of a user wearing the image capture eyewear.

Support structure 13 defines a region (e.g., region 52 (FIG. 1B) defined by the frame 12 and temples 14A and 14B) for receiving a portion 52 (e.g., the main portion) of the head of the user/wearer. The defined region(s) are one or more regions containing at least a portion of the head of a user that are encompassed by, surrounded by, adjacent, and/or near the support structure when the user is wearing the image capture eyewear 12.

Figure 1C:
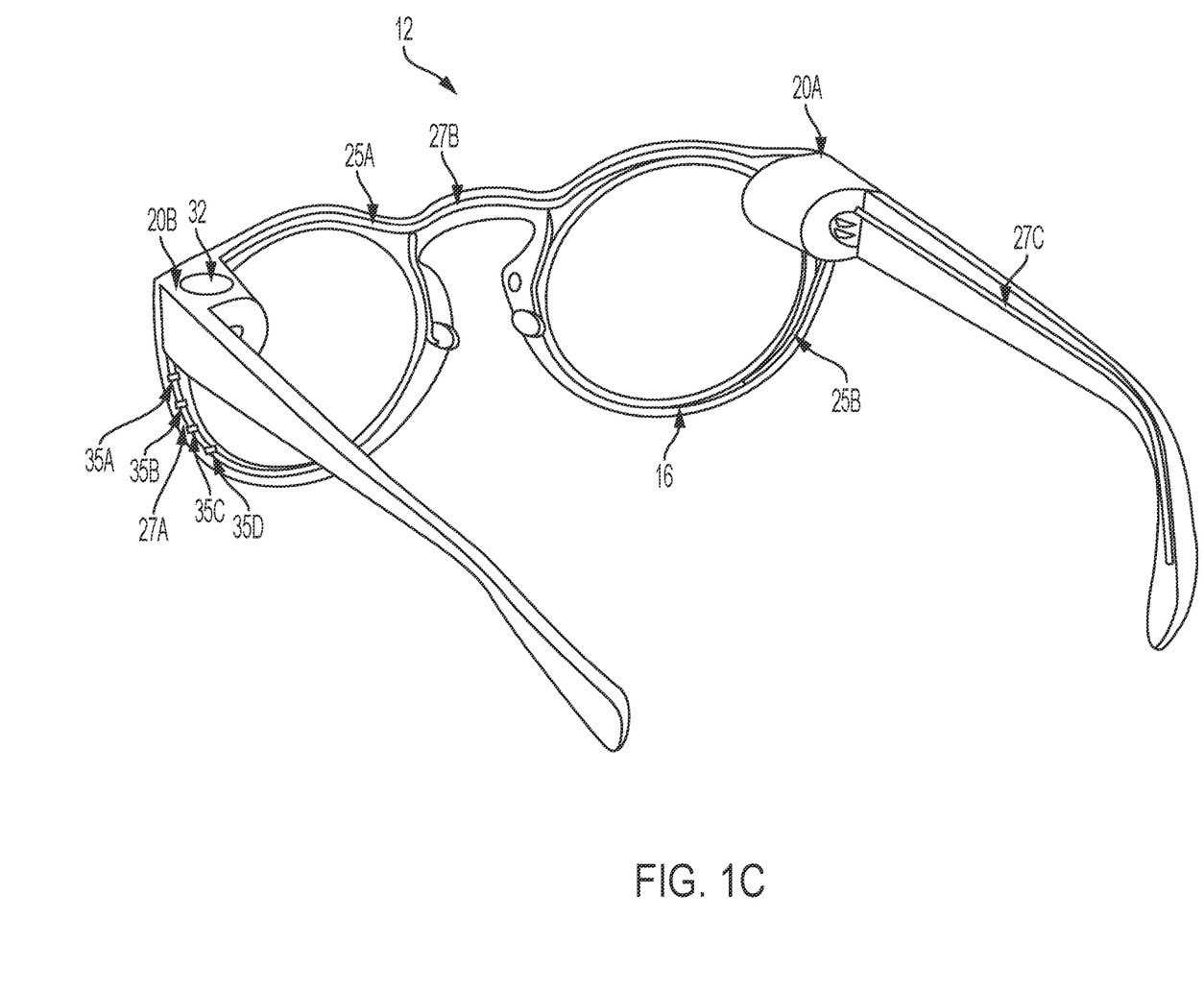
FIG. 1C is another perspective view of the image capture eyewear example of FIG. 1A.

FIG. 1C depicts a perspective view of the image capture eyewear 12 with a transparent central frame portion 16 for illustration purposes. Image capture eyewear 12 includes electronics 20A and 20B (e.g., camera, microphone, wireless transceiver, etc.). In addition, image capture eyewear 12 includes a selector 32 and an example of a display system (i.e., LEDs 35A-35D) installed at one or more locations throughout central frame portion 16 and/or temples 14A and 14B. For example, LEDs 35 could be located at installation locations 25A and 25B. These LEDs may include multicolor LEDs, or the like, that are electrically coupled to electronics 20A and 20B (e.g., through one or more flexible printed circuit boards (FPCBs)). In other examples, the display system may be a screen (e.g., projection, LCD, OLED, etc.)

The FPCBs include one or more electrical traces for routing electrical signals between the electronic components 20A and 20B and the LEDs 35. As illustrated in FIG. 1C, FPCBs are embedded throughout the eyewear 12. For example, a first FPCB 27A is in a rim of the eyewear 12, a second FPCB 27B extends through the central frame portion 16 across the bridge of the eyewear 12, and a third FPCB 27C extends through the temple 14A. More or fewer FPCBs may be utilized to achieve desired coupling of electronic components throughout the eyewear 12.

A molding process may embed these FPCBs into the frame and temples of image capture eyewear 12 during manufacturing. For example, during a first shot of a two-shot molding process, an injection-molding device injects plastic into a mold to form the front half of central frame portion 16 and/or temple 14A. After forming the front halves, a robotic device may insert and position the FPCBs and other electronic components (e.g., the LEDs) within the mold at locations with respect to the front halves. During a second shot of the two-shot molding process, the injection molding device injects more plastic into the mold to cover the components and form the back half of central frame portion 16 or temple 14A such that the FPCBs and electronics are embedded between the front and back halves of central frame portion 16 and/or temple 14A. After forming the frame and both temples using the molding process, the temples are mechanically connected to the frame (e.g., with screws) to form the finished image capture eyewear 12.

As described above, LEDs 35 may be located at various positions on image capture eyewear 12. One such location is on central frame portion 16 where multiple LEDs 35 are positioned in the frame and are electrically coupled to a FPCB. The manufacturer, based on various factors including but not limited to cost, LED size, frame size, FPCB size, and/or uniformity of illumination, may determine the position of and the distance between the LEDs 35.

For example, FIG. 1C shows image capture eyewear 12 including four LEDs 35. These LEDs are located at positions in central frame portion 16. In this example, the LEDs 35 are uniformly spaced from one another so that a user may discern quickly and easily which LED is illuminated. The manufacturer may choose the number of LEDs and spacing of the LEDs. Although not shown in FIG. 1C, the LEDs 35 could extend to other portions of the eyewear 12 such as the temples and other portions of the central frame portion 16, including, but not limited to the nose pad region and other regions surrounding the optical lenses.

In addition to spacing, the LEDs 35 may be oriented to direct light in a specific direction. FIG. 1C shows an example where the LEDs 35 are oriented to face the back portion of central frame portion 16 (i.e., aimed towards the user's face). This orientation ensures that the illumination of one or more of the LEDs 35 is easily visible to the user (e.g., the user can see the LEDs to identify the recipient of an image being captured) when the eyewear 12 is worn.

Figure 1D:
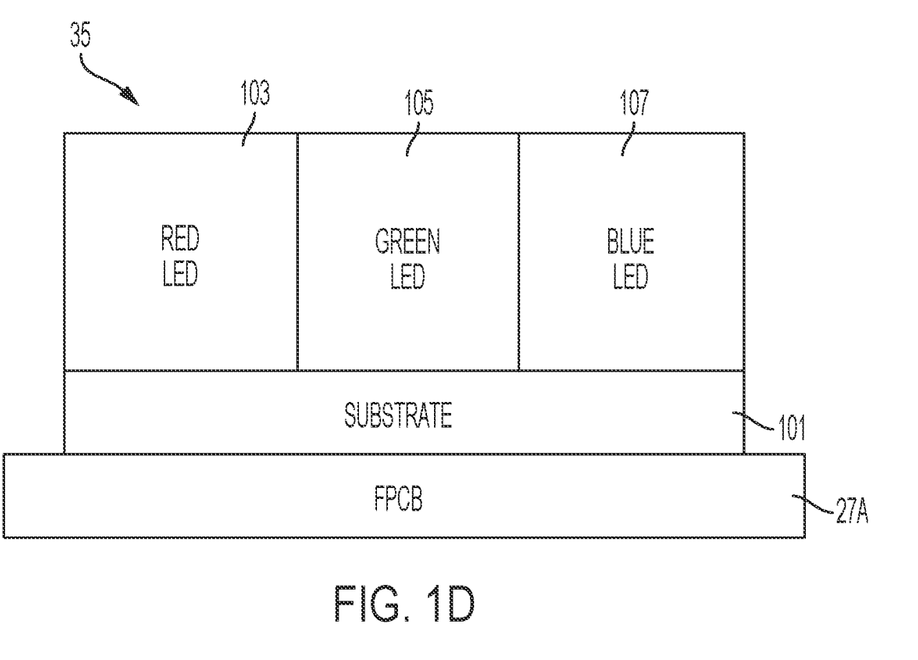
FIG. 1D is a multicolor LED for positioning on the image capture eyewear example in FIG. 1A.

The LEDs 35 may include surface mount multicolor LEDs as shown in FIG. 1D. Multicolor LED 100 in FIG. 1D includes four basic components. These components include a red colored LED 103, a green colored LED 105, and a blue colored LED 107 mounted (e.g. soldered, adhered, etc.) to a substrate 101 through separate control terminals. Although not shown, substrate 101 includes electrical contacts for making electrical couplings to traces in the FPCB 27A. Alternatively, LEDs 35 may be single color LEDs (e.g., white, red, green, or blue).

The following series of steps describe example steps for manufacturing image capture eyewear 12 with LEDs 35 on a FPCB. In a first step, a robotic device positions and mounts the LEDs 35 (e.g., by soldering, adhering, etc.) onto a portion of the FPCB 27A. For example, the robotic device may position the LEDs 35 at periodic locations on the FPCB 27A to produce the configuration shown in FIG. 1C. In a second step, an injection molding device partially embeds the LED 35 and FPCB 27A into one-half (e.g. a back half) of the central frame portion 16 during the first shot of the two-shot molding process. In a third step, the injection molding device fully embeds LED 35 and FPCB 27A into central frame portion 16 between the first half and second half during a second shot of the two-shot molding process.

Figure 1E:
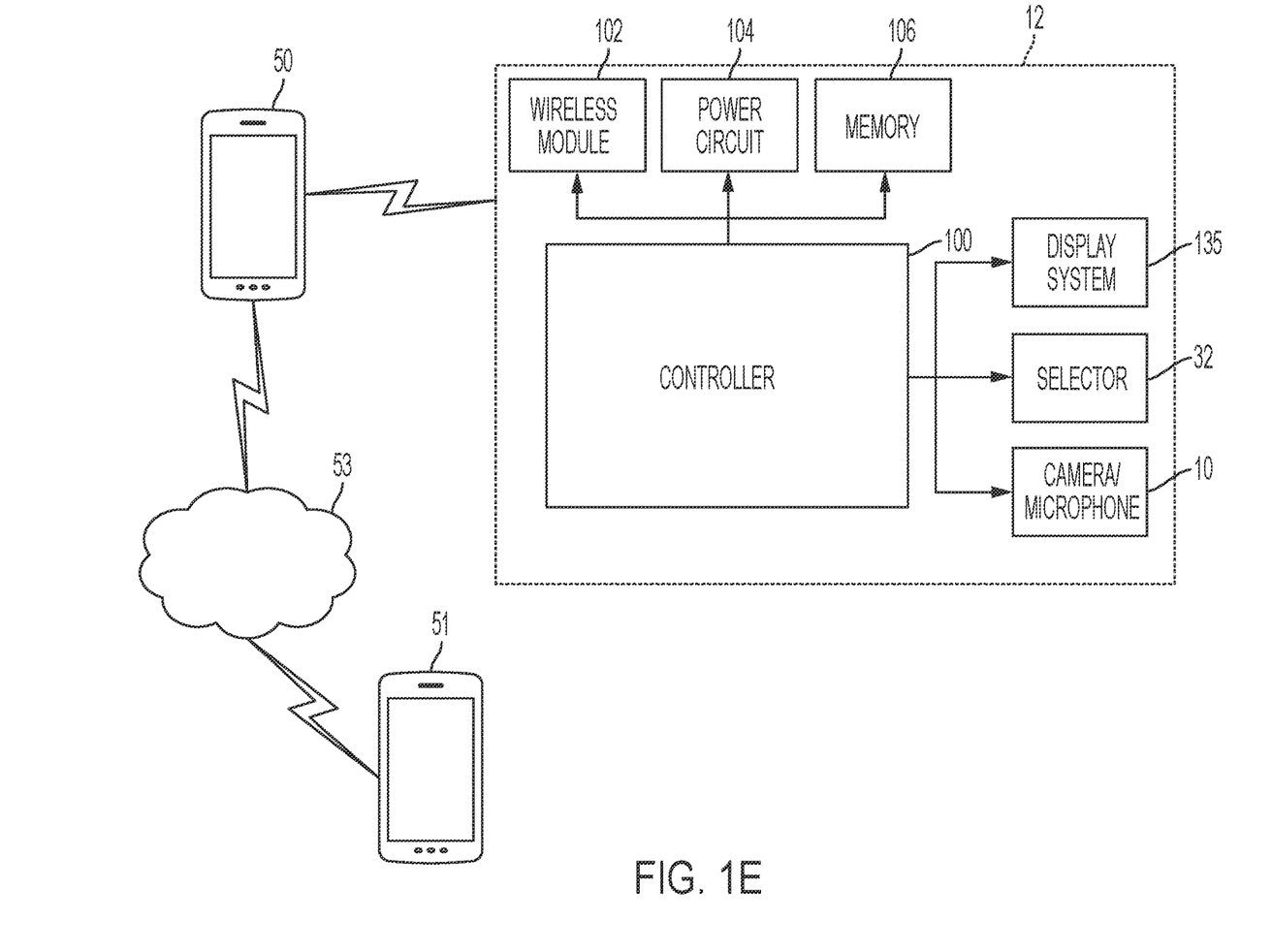
FIG. 1E is a block diagram of an example of the electronic components supported by the image capture eyewear example of FIG. 1A, and communication with a personal computing device and a recipient.

FIG. 1E is a block diagram of example electronic components coupled to a display system 135 (e.g., LEDs 35, a screen, or other technique for presenting information). The illustrated electronic components include a controller 100 (e.g., lower power processor, image processor, etc.) for controlling the various devices in the image capture eyewear 12; a wireless module (e.g., Bluetooth™) 102 for facilitating communication between the image capture eyewear 12 and a client device (e.g., a personal computing device 50); a power circuit 104 (e.g., battery, filter, etc.) for powering image capture eyewear 12; a flash storage 106 for storing data (e.g., images, video, image processing software, etc.); a selector 32; and a camera/microphone 10 for capturing an image, a series of images (e.g., video), and/or sound. Although the image capture eyewear 12 and the personal computing device are illustrated as separate components, the functionality of the personal computing device may be incorporated into the image capture eyewear enabling the image capture eyewear to directly send an image(s) to one or more recipients without the need for a separate computing device.

The selector 32 may trigger (e.g., via a momentary push of a button) controller 100 of image capture eyewear 12 to capture images/video. The same selector 32 or another selector may trigger (e.g., via a momentary push) the controller 100 to distinctly present one or more assignable recipient markers (e.g., selectively illuminate specific LED 35 corresponding to an intended recipient). In examples where a single selector 32 is utilized, the selector may be used in a set up mode (e.g., entered by pressing and holding the selector 32 for a period of time, e.g., 3 seconds) to selectively illuminate one or more of the LEDs 35 and in a second mode (e.g., entered after a period of time with no contact, e.g., 5 seconds) to capture images.

In an example, the selector 32 may be a physical button on the eyewear 12 that, when pressed, sends a user input signal to the controller 100. The controller 100 may interpret pressing the button for a predetermined period of time (e.g., three seconds) as a request to transition to a different mode of operation (e.g., in/out of a set-up mode of operation). In other examples, the selector 32 may be a virtual button on the eyewear or another device. In yet another embodiment, the selector may be a voice module that interprets voice commands or an eye detection module that detects where the focus of an eye is directed. Controller 100 may interpret signals from selector 32 as a trigger to cycle through illuminating LEDs 35 to select an intended recipient of the image(s).

Wireless module 102 may couple with a client/personal computing device 50 such as a smartphone, tablet, phablet, laptop computer, desktop computer, networked appliance, access point device, or any other such device capable of connecting with wireless module 102. Bluetooth, Bluetooth LE, Wi-Fi, Wi-Fi direct, a cellular modem, and a near field communication system, as well as multiple instances of any of these systems, for example, may implement these connections to enable communication there between. For example, communication between the devices may facilitate transfer of software updates, images, videos, lighting schemes, and/or sound between image capture eyewear 12 and the client device.

In addition, personal computing device 50 may be in communication with one or more recipients (e.g., recipient personal computing device 51) via a network 53. The network 53 may be a cellular network, Wi-Fi, the Internet or the like that allows personal computing devices to transmit and receive an image(s), e.g., via text, email, instant messaging, etc.

The camera/microphone 10 for capturing the images/video may include digital camera elements such as a charge-coupled device, a lens, or any other light capturing elements for capturing image data for conversion into an electrical signal(s). The camera/microphone 10 may additionally or alternatively include a microphone having a transducer for converting sound into an electrical signal(s).

The controller 100 controls the electronic components. For example, controller 100 includes circuitry to receive signals from camera 10 and process those signals into a format suitable for storage in memory 106 (e.g., flash storage). Controller 100 powers on and boots to operate in a normal operational mode, or to enter a sleep mode. In one example, controller 100 includes a microprocessor integrated circuit (IC) customized for processing sensor data from camera 10, along with volatile memory used by the microprocessor to operate. The memory may store software code for execution by controller 100.

Each of the electronic components require power to operate. Power circuit 104 may include a battery, power converter, and distribution circuitry (not shown). The battery may be a rechargeable battery such as lithium-ion or the like. Power converter and distribution circuitry may include electrical components for filtering and/or converting voltages for powering the various electronic components.

Assignable recipient markers (e.g., LEDs 35 or text/symbols presented on a screen), under control of controller 100 act as indicators on image capture eyewear 12 indicating selected recipient(s) of the image(s) to the user. For example, controller 100 may cycle through assignable recipient markers (e.g., LEDs 35 or when/how symbols are presented on a screen) each time the user presses selector 32 to indicate to whom the image capture eyewear 12 is going to transmit the image(s).

Figure 2:
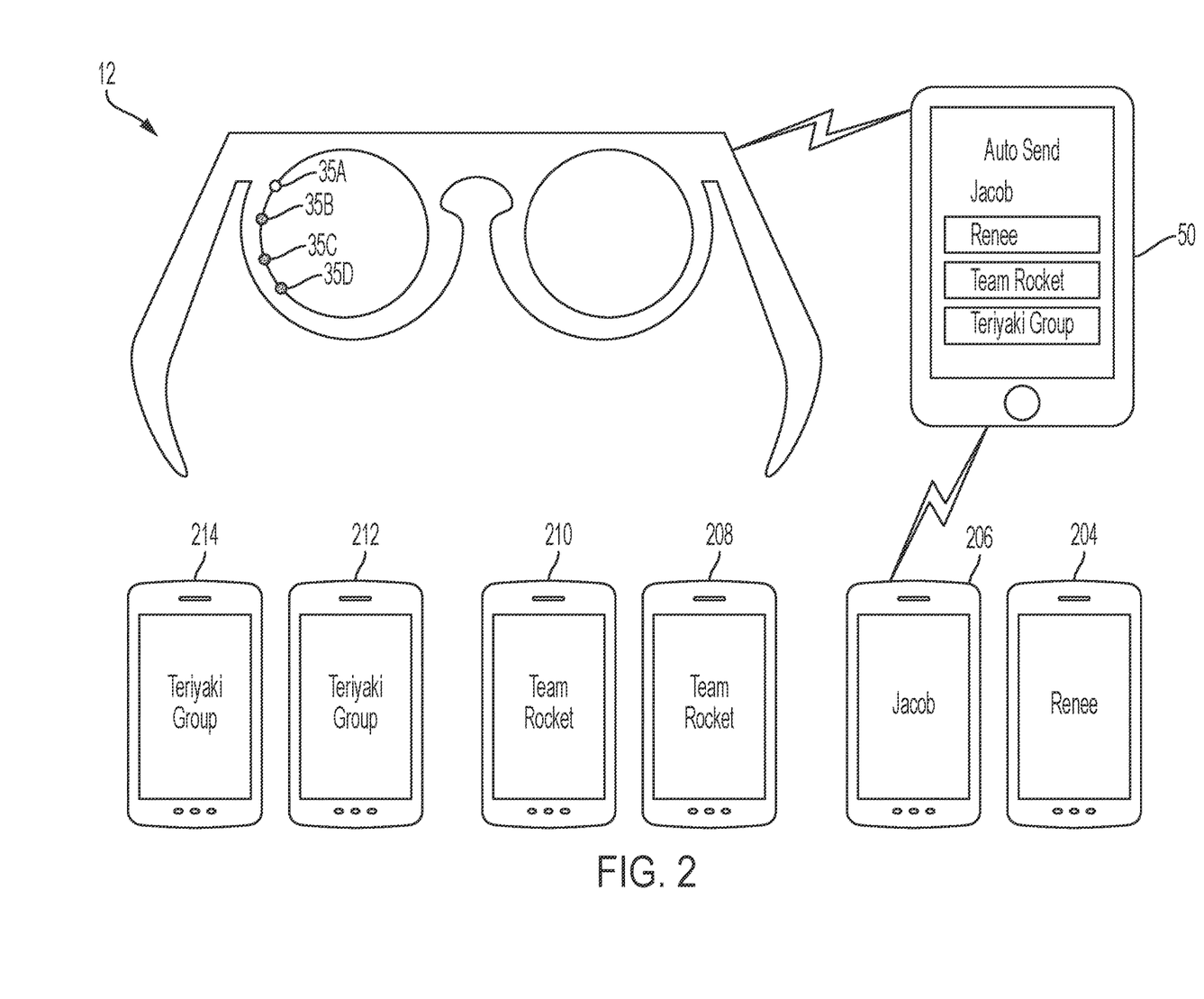
FIG. 2 is a view of the image capture eyewear example of FIG. 1A communicating with a personal computing device and multiple recipients.

FIG. 2 depicts an example system including the image capture eyewear 12 of FIG. 1A, a personal computing device 50 (e.g., a smartphone) of the user, and personal computing devices of multiple recipients. In one example, the image capture eyewear 12 is worn by the user and the personal computing device 50 is in proximity to the user or on the user's person (e.g., in their pocket, in their hand, etc.) to establish a direct communication link (e.g., Bluetooth™).

Prior to operating image capture eyewear 12, the user accesses a software application (app) running on personal computing device 50. The software application may present a graphical user interface on personal computing device 50 for receiving recipient assignments to assignable recipient markers from the user. The user, interacting with the software application, selects one or more recipients to associate with each of the assignable recipient markers (e.g., LEDs 35A, 35B, 35C and 35D) on image capture eyewear 12. Each assignable recipient marker may be associated with a single recipient or a group of recipients. In the example depicted in FIG. 2, the user assigns recipient Jacob 206 to a first assignable recipient marker (LED 35A), recipient Renee 204 to a second assignable recipient marker (LED 35B), recipient Team Rocket (2 group members 208 and 210) to a third assignable recipient marker (LED 35C), and recipient Teriyaki Group (2 group members 212 and 214) to a fourth assignable recipient marker (LED 35D). The software application may interface with contact information for the recipients stored on the personal computing device 50 of the user, e.g., in a personal address application, to facilitate selection and to retrieve a phone number for texting, an email address for sending an email, and/or other identifier for the recipient(s) on other communication platforms. The retrieved contact information may be stored in a table for use by the personal computing device 50 in sending a captured image(s) to the intended recipient(s).

In the example shown in FIG. 2, the user may set up the software application to send the next captured image(s) to recipient Jacob. In this example, the user uses selector 32 to select the first assignable recipient marker (LED 35A) which the user knows is associated with Jacob (e.g., the user previously selected the recipient Jacob and assigned Jacob to the first assignable recipient marker (LED 35A) using the software application). Once selected, the first assignable recipient marker (LED 35A) illuminates to let the user know that the next time an image(s) is captured the captured image(s) will be sent to recipient Jacob.

When LED 35A is illuminated, a press of selector 32 by the user results in the capture of an image or a series of images (e.g., 10 seconds worth of images) and the association of the captured image or series of images with an indicator corresponding to the illuminated indicator (e.g., the indicator may be a 2-bit sequence added by the controller 100 to meta data associated with the image or series of images). Once captured, the image(s) and the associated indicator is transmitted via wireless module 102 (e.g. via Bluetooth) to personal computing device 50 or may be stored in memory 106 until the personal computing device 50 is available for communication.

Once personal computing device 50 receives the image(s) and the associated ID, the software application recognizes that the ID is associated with recipient Jacob, retrieves associated contact information, and forwards (e.g., via cellular network) the image(s) to recipient Jacob (e.g., using a text message, email, or other communication platform). In addition, personal computing device 50 may store the image(s) in internal memory (not shown) or upload the image(s) to the cloud (not shown).

Figure 3A:
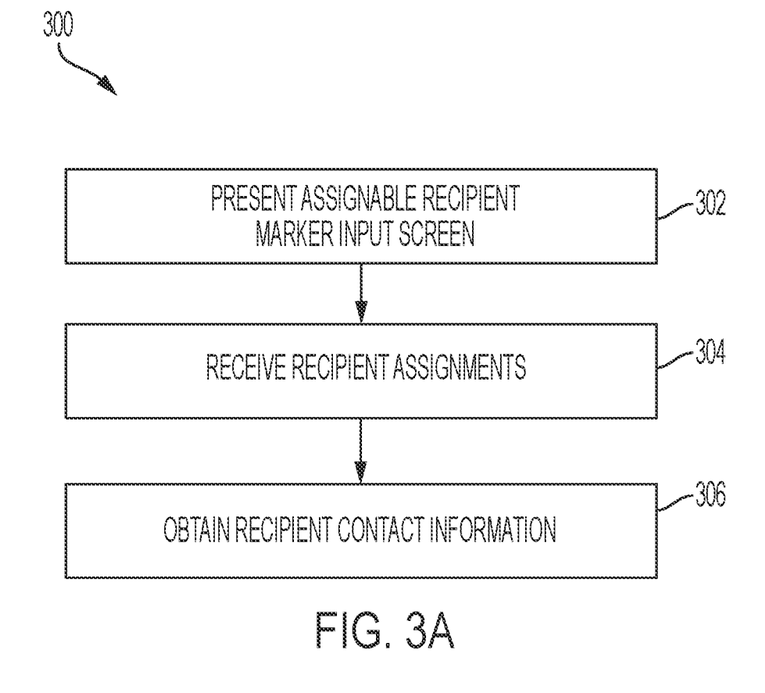
FIG. 3A is a flowchart showing an example of the operation of a personal computing device assigning recipients for auto forwarding images to recipients.

FIG. 3A depicts a flow chart 300 illustrating an example of the operation of a personal computing device (e.g., personal computing device 51) during a recipient assignment phase. In step 302, an input screen is presented by the personal computing device including recipient input fields associated with assignable recipient indicators (e.g., LEDs 35 or text/symbols for display on a screen). The input screen may be a graphical user interface (GUI) presented on a screen of the personal computing device 51. In step 304, recipient assignments are received. Recipients may be input into the GUI via a user interface such as a keypad or selected from stored recipients, e.g., from an electronic address book. In step 306, contact information for the recipient is obtained. The contact information may be input into the GUI via a user interface such as a keypad or selected from the stored recipient information, e.g., from the electronic address book where the recipient was identified.

Figure 3B:
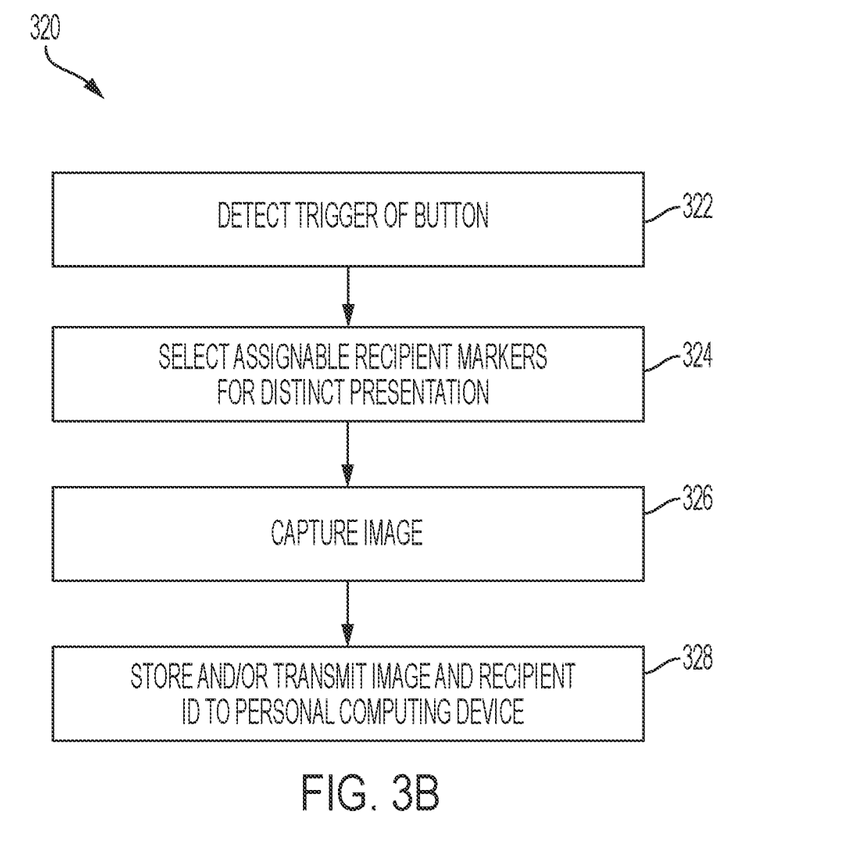
FIG. 3B is a flowchart showing an example of the operation of image capture eyewear.

FIG. 3B depicts a flow chart 320 illustrating an example of the operation of image capture eyewear (e.g., image capture eyewear 12 of FIG. 1) during an image capture and processing phase. In step 322, controller 100 detects a trigger resulting from actuation of the selector 32 in a first mode of operation (e.g., a set-up mode of operation). Controller 100 interprets this trigger as an indication that the user wants to distinctly present one or more assignable recipient markers (e.g., illuminate one or more specific LEDs or select when/how text/symbols are displayed on a screen; which a software application associates with one or more recipients). In step 324, the user utilizes selector 32 to select the assignable recipient marker(s) (under control of controller 100) that will be distinctly presented. In step 326, controller 100 detects a trigger resulting from actuation of selector 32 in a second mode of operation (e.g., an image capture mode of operation). This indicates to controller 100 that the user wants to capture an image(s) using camera 10. The controller 100 captures the image(s) using camera 10 and associates an indicator corresponding to the current distinctly presented recipient marker(s) with the image(s). After capturing the image(s), the controller 100 instructs the wireless module 102 (step 328) to transmit the image(s) and associated indicator to the personal computing device 50 (e.g., via Bluetooth) and/or store the image(s), e.g., until the personal computing device 50 is available to receive the image(s).

Figure 3C:
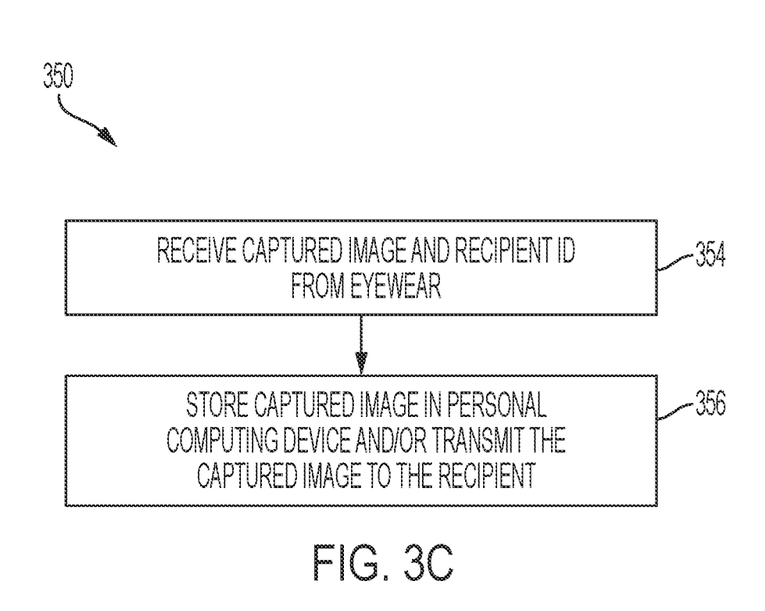
FIG. 3C is a flowchart showing an example of the operation of a personal computing device auto forwarding an image captured by image capture eyewear.

FIG. 3C depicts a flow chart 350 illustrating an example of the operation of a personal computing device (e.g., personal computing device 51) during an image auto forward phase. At step 354, personal computing device 50 receives captured image(s) and an associated indicator (e.g., captured and associated in step 326; FIG. 3B). Personal computing device 50 then stores the captured image(s) along with the associated indicator and/or transmits the image(s) to the intended recipient in step 356. The personal computing device may identify the intended recipient(s) based on the indicator received from the image capture eyewear 12 (e.g., the indicator corresponding to the recipient set in the software application in step 302), retrieve each of the recipient's contact information (e.g., email address, telephone number, etc.), and transmit the image(s) to the intended recipient(s) using the retrieved contact information.

Although the description and figures of the disclosure focus on an implementation where the assignable recipient indicators are located on the frame of the image capture eyewear 12, other configurations are possible. In one example, LEDs and/or light pipes (not shown) having locations in other portions of image capture eyewear 12, such as temples 14A/14B, and in areas of central frame portion 16 surrounding the optical lenses. In other examples, the assignable recipient indicators are projected on a lens of the eyewear or directly into the eye of the wearer or are displayed by display screen.

The steps in FIGS. 3A-3C may be performed by controller 100 of the electronic components and/or the personal computing device upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 100 or personal computing device 50 described herein, such as the steps in FIGS. 3A-3C, may be implemented in software code or instructions that are tangibly stored on a tangible computer readable medium. Upon loading and executing such software code or instructions by the controller and/or personal computing device, the controller and/or personal computing device may perform any of the functionality of the controller and/or personal computing device described herein, including the steps in FIGS. 3A-3C described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. Image capture eyewear comprising:
a support structure;
a display system supported by the support structure, the display system configured to present a first recipient indicator and a second recipient indicator;
a transmitter;
a camera connected to the support structure to capture an image of a scene; and
a processor configured to assign one or more recipients to each of the first recipient indicator and the second recipient indicator, cause the display system to distinctly present one of the first recipient indicator or the second recipient indicator, cause the camera to capture the image of the scene when the first recipient indicator or the second recipient indicator is distinctly presented; and cause the transmitter to transmit the captured image for delivery to the one or more of the recipients assigned to the first recipient indicator or to the second recipient indicator that was distinctly presented when the image was captured.

2. The image capture eyewear of claim 1, wherein the display system includes a plurality of light emitting diodes (LEDs) supported by the support structure and wherein the first recipient indicator is a first LED and the second recipient indicator is a second LED.

3. The image capture eyewear of claim 1, wherein the display system includes a screen having a display area configured to present the first recipient indicator and the second recipient indicator.

4. The image capture eyewear of claim 3, wherein the first recipient indicator is a first symbol presented on the screen and the second recipient indicator is a second symbol presented on the screen.

5. The image capture eyewear of claim 4, wherein the image capture eyewear is configured to present the first symbol and the second symbol sequentially in response to receiving a trigger signal.

6. The image capture eyewear of claim 1, wherein the processor is further configured to cause the transmitter to transmit the captured image along with an indicator corresponding to the distinctly presented indicator for use in identifying the one or more of the recipients assigned to the first recipient indicator or to the second recipient indicator that was distinctly presented when the image was captured.

7. The image capture eyewear of claim 6, further comprising:
a wireless module configured to transmit the captured image and the indicator to a personal computing device.

8. The image capture eyewear of claim 7, further comprising:
a memory configured to store the captured image and the indicator.

9. A method for sending images captured with image capture eyewear, the image capture eyewear including a support structure, a display system, and a camera, the method comprising:
assigning one or more recipients to each of a first recipient indicator and a second recipient indicator;
distinctly presenting one of the first recipient indicator or the second recipient indicator by the display system;
capturing an image of a scene with the camera when the first recipient indicator or the second recipient indicator is distinctly presented by the display system; and
transmitting the captured image for delivery to the one or more of the recipients assigned to the first recipient indicator or to the second recipient indicator that was distinctly presented when the image was captured.

10. The method of claim 9, wherein the display system includes a plurality of light emitting diodes (LEDs) supported by the support structure, the first recipient indicator is a first LED and the second recipient indicator is a second LED, and the distinctly presenting comprises:

illuminating the first LED or illuminating the second LED.

11. The method of claim 9, wherein the display system includes a screen, the first recipient indicator is a first symbol presented on the screen and the second recipient indicator is a second symbol presented on the screen, and the distinctly presenting comprises:

displaying at least one of the first symbol or the second symbol on the screen.

12. The method of claim 11, wherein the image capture eyewear is configured to display the first symbol and the second symbol sequentially in response to receiving a trigger signal initiated.

13. The method of claim 9, wherein the transmitting comprises transmitting the captured image along with an indicator corresponding to the distinctly presented recipient indicator for use in identifying the one or more of the recipients assigned to the first recipient indicator or to the second recipient indicator that was distinctly presented when the image was captured.

14. The method of claim 13, wherein the transmitting comprises:

transmitting the captured image and the indicator to a personal computing device.

15. The method of claim 14, further comprising:

storing the captured image and the indicator.

16. A non-transitory computer readable medium including instructions for execution by a processor to configure image capture eyewear including a support structure, a display system, and a camera, the instructions, when executed by the processor, configure the image capture eyewear to perform functions comprising:

assigning one or more recipients to each of a first recipient indicator and a second recipient indicator;

distinctly presenting one of the first recipient indicator or the second recipient indicator by the display system;

capturing an image of a scene with the camera when the first recipient indicator or the second recipient indicator is distinctly presented by the display system; and transmitting the captured image for delivery to the one or more of the recipients assigned to the first recipient indicator or to the second recipient indicator that was distinctly presented when the image was captured.

17. The non-transitory computer readable medium of claim 16, wherein the display system includes a screen, the first recipient indicator is a first symbol presented on the screen and the second recipient indicator is a second symbol presented on the screen, and the distinctly presenting comprises:

displaying at least one of the first symbol or the second symbol on the screen.

18. The non-transitory computer readable medium of claim 17, wherein the image capture eyewear is configured to display the first symbol and the second symbol sequentially in response to receiving a trigger signal.

19. The non-transitory computer readable medium of claim 16, wherein the transmitting comprises transmitting the captured image along with an indicator corresponding to the distinctly presented recipient indicator for use in identifying the one or more of the recipients assigned to the first recipient indicator or to the second recipient indicator that was distinctly presented when the image was captured.

20. The non-transitory computer readable medium of claim 19, wherein the transmitting comprises transmitting the captured image and the indicator to a personal computing device and the functions further comprise:

storing the captured image and the indicator.

* * * * *